(12) United States Patent
Kim et al.

(10) Patent No.: US 10,547,050 B2
(45) Date of Patent: Jan. 28, 2020

(54) HIGH SPECIFIC SURFACE AREA HARD CARBON-BASED ELECTRODE ACTIVE MATERIAL THROUGH CARBONIZATION PROCESS CONTROL AND ELECTRODE ACTIVE MATERIAL BY THEREOF

(71) Applicant: KOREA INSTITUTE OF CARBON CONVERGENCE TECHNOLOGY, Jeonju-si, Jeollabuk-do (KR)

(72) Inventors: Byungjoo Kim, Jeongeup-si (KR); Hyemin Lee, Jeonju-si (KR)

(73) Assignee: KOREA INSTITUTE OF CARBON CONVERGENCE TECHNOLOGY, Jeongju-si (KR)

( * ) Notice: Subject to any disclaimer, the term of this patent is extended or adjusted under 35 U.S.C. 154(b) by 263 days.

(21) Appl. No.: 15/322,412

(22) PCT Filed: Oct. 26, 2016

(86) PCT No.: PCT/KR2016/012032
§ 371 (c)(1),
(2) Date: Dec. 27, 2016

(87) PCT Pub. No.: WO2018/043800
PCT Pub. Date: Mar. 8, 2018

(65) Prior Publication Data
US 2018/0212229 A1  Jul. 26, 2018

(30) Foreign Application Priority Data
Aug. 30, 2016 (KR) .................. 10-2016-0110997

(51) Int. Cl.
*H01M 4/1393* (2010.01)
*C01B 32/318* (2017.01)
(Continued)

(52) U.S. Cl.
CPC ......... *H01M 4/1393* (2013.01); *C01B 32/318* (2017.08); *C01B 32/336* (2017.08); *H01M 4/0471* (2013.01); *H01M 4/133* (2013.01); *C01P 2006/12* (2013.01); *H01M 4/96* (2013.01)

(58) Field of Classification Search
CPC ......... H01M 2004/027; H01M 4/1393; H01M 4/96; H01M 4/0471
See application file for complete search history.

(56) References Cited

U.S. PATENT DOCUMENTS 8,916,296 B2 * 12/2014 Feaver ............... H01M 4/8615
429/236
9,464,162 B2 * 10/2016 Kron ....................... C08G 8/10
(Continued)

FOREIGN PATENT DOCUMENTS

CN   103855366 A  *  6/2014
CN   103855366 A     6/2014
(Continued)

OTHER PUBLICATIONS

Chang, Zhen-Zhen et al., "Influence of H2 Reduction on Lignin-Based Hard Carbon Performance in Lithium Ion Batteries.", Electrochimica Acta, Jul. 21, 2015, vol. 176 , p. 1352-1357.
(Continued)

*Primary Examiner* — Atul P. Khare
(74) *Attorney, Agent, or Firm* — Novick, Kim & Lee, PLLC; Sang Ho Lee (57) ABSTRACT

A method of preparing a hard carbon-based electrode active material having high specific surface area by carbonization process control, comprises charging polyurethane into a high temperature furnace, supplying oxygen gas to the high temperature furnace and oxidizing the polyurethane under an oxygen atmosphere, supplying a nitrogen gas to the high temperature furnace and heating to carbonize a stabilized polyurethane under a nitrogen atmosphere, thereby producing
(Continued)

ing a hard carbon, heating the hard carbon under a nitrogen atmosphere and supplying steam to activate the hard carbon under a steam atmosphere, thereby producing an active carbon, supplying hydrogen and reducing the active carbon under a hydrogen atmosphere, and cooling the active carbon under a nitrogen atmosphere.

9 Claims, 4 Drawing Sheets

(51) Int. Cl.
    *C01B 32/336*      (2017.01)
    *H01M 4/04*      (2006.01)
    *H01M 4/133*      (2010.01)
    *H01M 4/96*      (2006.01)

(56) References Cited

U.S. PATENT DOCUMENTS 10,173,900 B2 * 1/2019 Ludvik ................. H01M 4/133
2008/0283413 A1 * 11/2008 Suzuki ................. G01N 27/404
                                                                               205/555

FOREIGN PATENT DOCUMENTS

| JP | 2000090927 A | * | 3/2000 |
| JP | 2007-269551 A | | 10/2007 |
| KR | 10-2006-0015252 A | | 2/2006 |
| KR | 100912203 B1 | * | 8/2009 |
| KR | 20130083164 A | * | 7/2013 |
| KR | 101375688 B1 | * | 3/2014 |
| KR | 10-2015-0012236 A | | 2/2015 |
| KR | 10-1653488 B1 | | 9/2016 |
| KR | 101653488 B1 | * | 9/2016 |

OTHER PUBLICATIONS

Joong Kee Lee et al., "Electrochemical properties of PAN-based carbon fibers as anodes or rechargeable lithium ion batteries." Carbon, Aug. 2001, vol. 39, Issue 9, p. 1299-1305.

Joong Kee Lee et al., "Electrochemical properties of PAN-based carbon fibers as anodes for rechargeable lithium ion batteries." Carbon, Aug. 2001, vol. 39, Issue 9, p. 1299-1305.

* cited by examiner

HIGH SPECIFIC SURFACE AREA HARD CARBON-BASED ELECTRODE ACTIVE MATERIAL THROUGH CARBONIZATION PROCESS CONTROL AND ELECTRODE ACTIVE MATERIAL BY THEREOF

CROSS-REFERENCE TO RELATED APPLICATION

This application is a national-stage application under 35 USC § 371 and claims priority to Korean Patent Application No. 10-2016-0110997 filed in the Korean Intellectual Property Office on Aug. 30, 2016, the entire contents of which are incorporated herein by reference.

BACKGROUND OF THE DISCLOSURE

Field of the Disclosure

The present invention relates to a method of producing a hard carbon-based electrode active material having high specific surface area through carbonization process control and an electrode active material produced thereby, and more particularly, to a method of producing an active carbon by using polymer of a polyurethane resin to increase yield of carbonization through oxidation/stabilization process prior to carbonization, to control the crystallization of hard carbon by controlling the carbonization temperature of carbonizing in a high temperature furnace, and to have excellent pore and electrochemical characteristics by removing oxygen functional groups formed in an activation process.

Description of the Related Art

Recently, due to high oil prices and popular use of smart portable devices, interest in renewable energy and energy storage devices is increasing.

Active carbon is a material mainly applied to environmental purification and energy storage due to peculiar pore characteristics. These conventional active carbons were concentrated only on precursors and activation process.

An active carbon is produced by carbonizing a precursor to form graphite grains and oxidizing graphite grains in the activation process to form pores. Therefore, it is necessary to study not only the precursor but also the carbonization process because the pore characteristics of active carbon are greatly affected by crystallinity. In addition, the oxidation/stabilization processes prior to the carbonization process affects the formation of the crystal grains in the carbonization process, increasing the carbonization yield and narrowing the distribution of the crystal size. In addition, since the oxygen functional groups of the active carbon produced in the activation process generate resistance to the organic electrolyte in the electrochemical characteristics, research regarding post treatment after activation is needed.

The following patent document is disclosed in the prior art relating to the production of active carbon.

In the prior art, active material for an electrode is prepared by using polyurethane as a precursor, and however there are problems of lacking of research on the crystallization control in the carbonization process affecting the activation process, the oxidation/stabilization process prior to the carbonization and the removal of the oxygen functional group after the activation.

SUMMARY OF THE DISCLOSURE

Technical Problem

The object of the present invention is to provide a method of producing a hard carbon-based electrode active material having high specific surface area through carbonization process control and an electrode active material produced thereby, which improves a yield of carbonization through an oxidation prior to carbonization/stabilization process when producing active carbon using a polyurethane resin as a polymer, and controls the carbonization temperature and finally crystallinity of hard carbon when carbonizing in a high temperature furnace, and realizes excellent pore characteristics and electrochemical characteristics by removing an oxygen functional group formed in the activation process.

Technical Solution

To accomplish the objects of the present disclosure, an embodiment of the present disclosure provides a method of preparing a hard carbon-based electrode active material having high specific surface area by carbonization process control, comprising: (a) charging polyurethane into a high temperature furnace; (b) heating the polyurethane under a nitrogen atmosphere by supplying nitrogen gas into the high temperature furnace to carbonize the polyurethane, thereby producing a hard carbon; (c) heating the hard carbon under a nitrogen atmosphere, supplying steam to activate the hard carbon under a steam atmosphere, thereby producing an active carbon; and (d) cooling the active carbon under a nitrogen atmosphere.

In the (b), the high temperature furnace may be heated to reach an internal temperature of 600 to 900° C. in order to carbonize the polyurethane charged in the high temperature furnace.

In the (b), the high temperature furnace may be heated to reach 600 to 900° C. of an internal temperature thereof when heating the polyurethane charged in the high temperature furnace, and carbonization is performed for 1 to 2 hours after a temperature is elevated at a rate 10° C./min.

In the (c), the steam may be supplied after an internal temperature of the high temperature furnace under a nitrogen atmosphere supplied with the nitrogen gas is maintained at 900° C., and the hard carbon is activated in the high temperature in the steam atmosphere for 10 to 40 minutes.

In addition, another embodiment of the present invention provides a method of preparing a hard carbon-based electrode active material having high specific surface area by carbonization process control, comprising: (a) charging polyurethane into a high temperature furnace; (b) stabilizing the polyurethane by supplying oxygen gas to the high temperature furnace, heating and oxidizing the polyurethane under an oxygen atmosphere: (c) supplying a nitrogen gas to the high temperature furnace and heating to carbonize a stabilized polyurethane under a nitrogen atmosphere, thereby producing a hard carbon; (d) heating the hard carbon under a nitrogen atmosphere, and supplying steam to activate the hard carbon under a steam atmosphere, thereby producing an active carbon; (e) heating the active carbon in a hydrogen atmosphere and reducing an oxygen functional group of the active carbon under a hydrogen atmosphere; and (f) cooling the active carbon under a nitrogen atmosphere.

In the (b), the high temperature furnace may be heated to reach an internal temperature of 250 to 400° C. in order to oxidize the polyurethane charged in the high temperature furnace.

In the (b), the high temperature furnace may be heated to reach 250 to 400° C. of an internal temperature thereof when oxidizing the polyurethane charged in the high temperature furnace, and oxidation is performed for 1 to 2 hours after a temperature is elevated at a rate 1-10° C./min.

The oxygen gas of the (b) may be a mixture gas in oxygen concentration of 10 to 100% and external gas (oxygen concentration of 21%) may be used.

In the (c), the high temperature furnace may be heated to reach an internal temperature of 600 to 900° C. in order to carbonize the polyurethane charged in the high temperature furnace.

In the (c), the high temperature furnace may be heated to reach 600 to 900° C. of an internal temperature thereof when heating the polyurethane charged in the high temperature furnace, and carbonization is performed for 1 to 2 hours after a temperature is elevated at a rate 10° C./min.

In the (d), the steam may be supplied after an internal temperature of the high temperature furnace under a nitrogen atmosphere supplied with the nitrogen gas is maintained at 900° C., and the hard carbon is activated in the high temperature in the steam atmosphere for 10 to 40 minutes.

In the (e), the high temperature furnace may be heated to reach an internal temperature of 200 to 350° C. in order to reduce the active carbon charged in the high temperature furnace.

The hydrogen gas of the (e) may be a mixture gas in hydrogen concentration of 1 to 20%.

In addition, the present invention provides an electrode active prepared by the above method, having a specific surface area of 1,620 to 2,460 m²/g.

Advantageous Effects

The present invention relates to a method for controlling the crystallinity and surface functional groups of activated carbon to have higher yields, excellent pore and electrochemical characteristics and since it does not use chemicals, such as conventional medical activators, it is not only environmentally friendly, but also has the effect of producing an activated carbon or a high specific surface area hard carbon-based electrode active material at a low cost.

The present invention can implement higher pore characteristics and electrochemical characteristics than conventional commercialized activated carbon, and thus can provide an electrode material for electrochemical capacitors, an electrode material for hydrogen storage, a vapor storage material, an adsorbent for removing NOx and SOx and it is expected to be useful as a material for energy storage and environmental purification.

MODES FOR CARRYING OUT THE INVENTION

The present invention relates to a method of preparing a hard carbon-based electrode active material having high specific surface area by carbonization process control, comprising:

(a) charging polyurethane into a high temperature furnace;

(b) heating the polyurethane under a nitrogen atmosphere by supplying nitrogen gas into the high temperature furnace to carbonize the polyurethane, thereby producing a hard carbon;

(c) heating the hard carbon under a nitrogen atmosphere, supplying steam to activate the hard carbon under a steam atmosphere, thereby producing an active carbon; and (d) cooling the active carbon under a nitrogen atmosphere.

DETAILED DESCRIPTION OF THE EMBODIMENTS

Example embodiments will now be described more fully hereinafter with reference to the accompanying drawings; however, they may be embodied in different forms and should not be construed as limited to the embodiments set forth herein. In addition, these embodiments are provided so that this disclosure will be thorough and complete and will fully convey the scope of the example embodiments to those skilled in the art. In order to clearly illustrate the present invention in the drawings, parts not related to the description are omitted, and like parts are denoted by similar reference numerals throughout the specification.

Throughout the specification, when a component "comprises" a component, it is understood that the component may include other components, and may not exclude any other component, unless specifically stated otherwise.

Hereinafter, embodiments of the present invention will be described in detail with reference to FIGS. 1 to 3.

Figure 1:
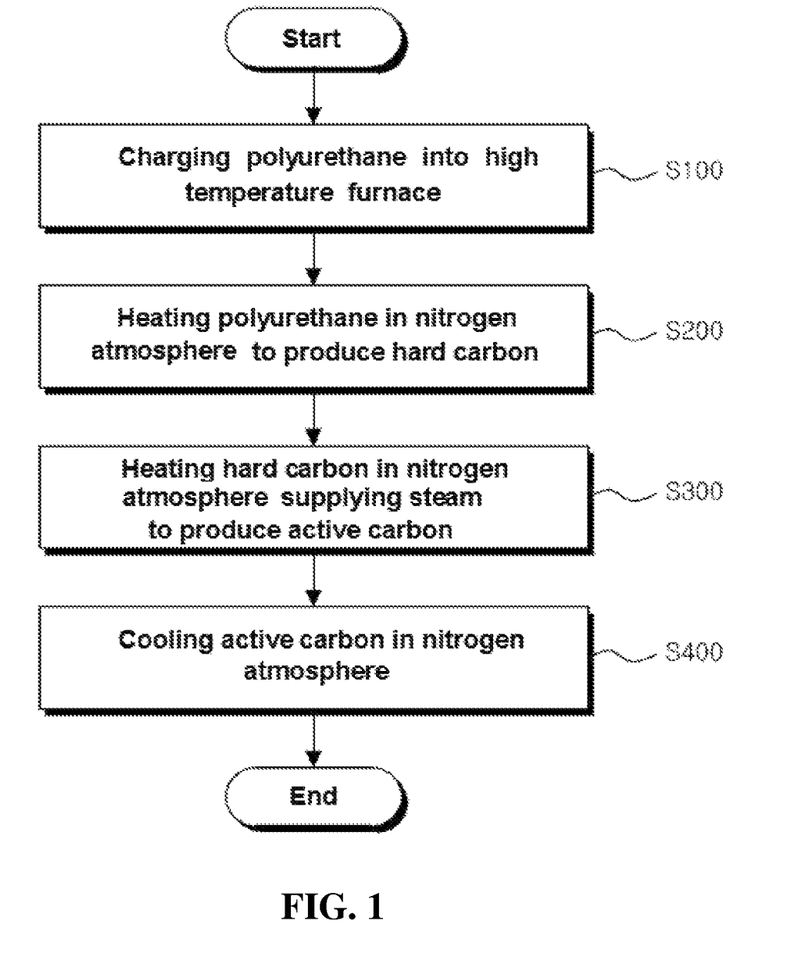
FIG. 1 is a flowchart sequentially illustrating a method of preparing a hard carbon-based electrode active material having high specific surface area by carbonization process control according to an embodiment of the present invention.
Figure 2:
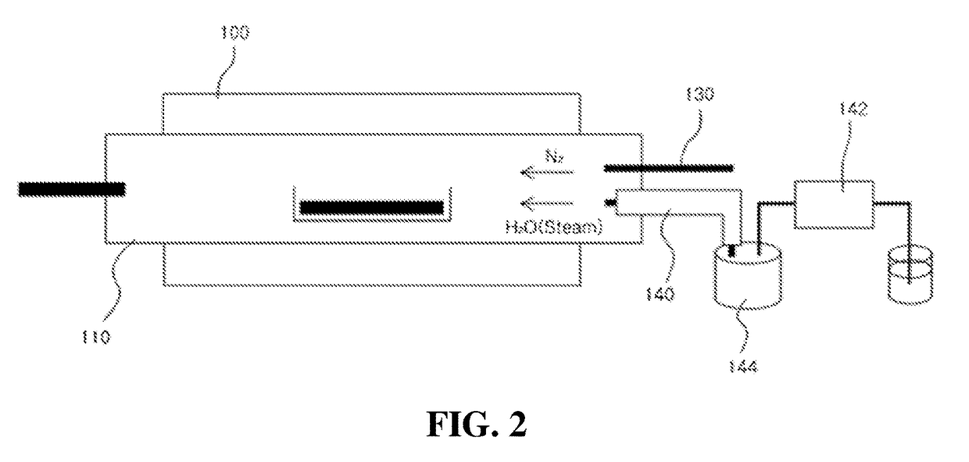
FIG. 2 is a block diagram briefly showing the configuration of a high temperature furnace used in the production of a hard carbon-based electrode active material having high specific surface area according to an embodiment of the present invention.
Figure 3:
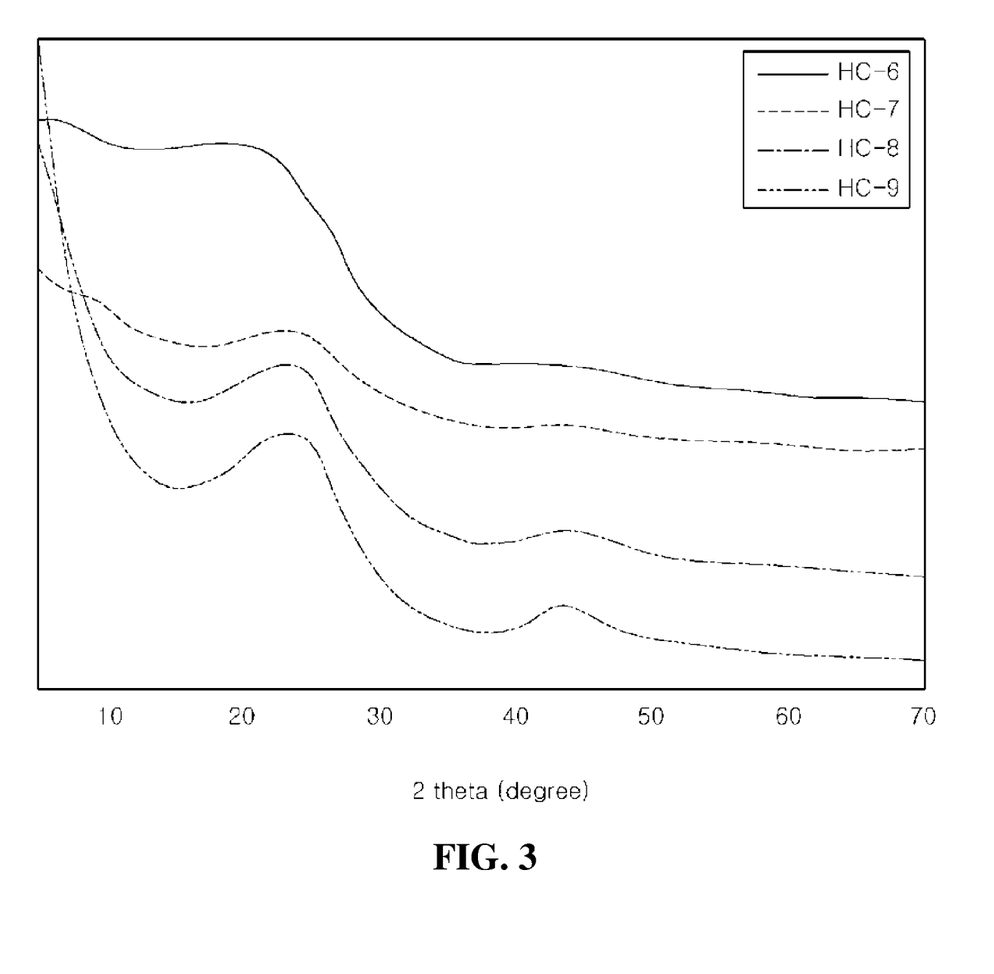
FIG. 3 is an X-ray diffraction curve of a hard carbon produced at a carbonization temperature of 600 to 900° C. produced by the method of the present invention.

FIG. 1 is a flowchart sequentially illustrating a method of preparing a hard carbon-based electrode active material having high specific surface area by carbonization process control according to an embodiment of the present invention and FIG. 2 is a block diagram briefly showing the configuration of a high temperature furnace used in the production of a hard carbon-based electrode active material having high specific surface area according to an embodiment of the present invention. Prior to the description of FIG. 1, the high temperature furnace will be briefly described.

The high temperature furnace 100 used in the production of the hard carbon-based electrode active material having high specific surface area according to the embodiment of the present invention may be a closed circulation type high temperature furnace 100 in which a nitrogen feed pipe 130 and a steam feed pipe 140 may be formed to supply nitrogen gas and steam into an inside of a tube 110.

The tube 110 is disposed in the high temperature furnace 100. The tube 110 may be formed of various materials such as iron (including stainless steel), alumina, and aluminum so that polyurethane can be charged to produce active carbon. It is preferable that the tube 110 is made of steel so as to solve the problem of durability of the tube 110 when rotating at a high temperature.

The tube 110 is configured such that the entire carbonization and activation conditions are performed at a high temperature of 600 to 1100° C., and therefore a suitable SiC heating element is located at the top and the bottom.

The high temperature furnace 100 supplies oxygen, nitrogen, and hydrogen gas through the gas supply pipe 130, and receives steam through the steam feed pipe 140. At this time, a heating furnace 144 and a flow controller 142 are provided at a rear end of the steam feed pipe 140 to regulate the amount of steam. At this time, the heating furnace 142 is heated to about 200° C., and the steam feed pipe 140 is maintained at about 180° C.

Hereinafter, a method for producing active carbon with controlled crystallinity according to an embodiment of the present invention will be described with reference to FIG. 1.

Referring to FIG. 1, a crystallization-controlled active carbon manufacturing method includes the steps of charging polyurethane into a high temperature furnace (S100), heating a high temperature furnace under a nitrogen atmosphere to produce hard carbon (S200), of generating active carbon by supplying water vapor after heating in a nitrogen atmosphere (S300), and cooling (S400) a nitrogen atmosphere.

First, the polyurethane is charged into the high temperature furnace 100 (S100). At this time, polyurethane having a molecular weight of 300 to 3000 is preferably used as the polyurethane, and it is preferable to crush the particle size to 10 to 200 mesh in order to facilitate the following carbonization and activation process.

At this time, when the molecular weight of the polyurethane as the polymer is less than 300, there is a disadvantage in that the thermal stability of the polyurethane resin synthesized by the formation of the monol is lowered and melting occurs in the carbonization step. When the molecular weight of the polyurethane exceeds 3000, the amorphous carbon chains are increased in the polyurethane structure and the thermal stability of the polyurethane resin is lowered.

Also, when the particle size of the polyurethane is less than 10 mesh, the water vapor does not reach the inside in the activation step, so that the activation is not performed well and the pore characteristics are weakened.

When the particle size of the polyurethane exceeds 200 mesh, dust is generated due to the convection by the reaction gas in the carbonization and activation step, and the yield of the active carbon is decreased due to the oxidation of the small particles during the activation.

Next, the polyurethane charged in the high temperature furnace 100 is carbonized by heating in a high temperature furnace 100 under a nitrogen atmosphere supplied with nitrogen gas to obtain the hard carbon 120 (S200).

The interior of the high temperature furnace 100 in which the polyurethane is charged must remove all of the air inside the tube 110 to produce hard carbon powder and active carbon.

For this, nitrogen ($N_2$) gas of 99.99% or more is charged into the tube 110 from the nitrogen inlet tube 130 for 30 minutes or longer to stabilize the inside of the tube before the temperature rise. Subsequently, in the nitrogen atmosphere of the high temperature furnace 100, the finely pulverized polymer is heated from 600 to 1100° C. at a heating rate of 10° C./min and then carbonized for 1 to 2 hours.

If the temperature is less than 600° C., the carbonization is not completely performed, the activation is not performed well, and the pore characteristics are weakened. When the temperature exceeds 1100° C., most of the constituents remain only carbon, A problem occurs in that the characteristics are lowered.

Next, the hard carbon 120 obtained in the second step is heated in a high temperature furnace 100 under a nitrogen atmosphere filled with nitrogen gas and then is activated in a high temperature furnace 100 under a steam atmosphere filled with steam to obtain an active carbon (S300).

If the temperature of the tube 110 filled with nitrogen is maintained at 800 to 1100° C. and the temperature of the high temperature furnace 100 is raised to the activation temperature, the supply of nitrogen gas is stopped, and then steam is supplied to the tube 110 and the inside of the tube 110 is filled with steam and converted into a steam atmosphere, and the hard carbon is activated for 10 to 60 minutes. It is to control the activation reaction of hard carbon by steam based on time.

If the activation temperature is lower than 800° C., the activation reaction of hard carbon is not performed well, and if the activation temperature is higher than 1100° C., the yield is very low due to excessive activation reaction.

As shown in the following Table 1, the activation of the hard carbon is carried out at a high temperature furnace 100 in a nitrogen atmosphere for 10 to 40 minutes, in which nitrogen gas is filled with and maintained at 900° C. and steam is supplied.

In another embodiment for activating the hard carbon, the steam is supplied after an internal temperature of the high temperature furnace 100 in a nitrogen atmosphere supplied with the nitrogen gas is maintained at 1000° C., and the hard carbon is activated in the high temperature 100 under the steam atmosphere for 10 to 20 minutes.

Finally, an active carbon obtained by activating hard carbon is cooled under a nitrogen atmosphere to produce active carbon (S400).

After the step of activating the hard carbon is completed, the supply of water vapor is stopped, the nitrogen is charged, and the atmosphere is switched to the nitrogen atmosphere to stabilize the inside of the tube 110 and cool the active carbon.

In the cooling step, the active carbon is cooled to room temperature under a nitrogen atmosphere to obtain active carbon which is a final product having excellent physical properties such as pore characteristics. The prepared active carbon is pulverized to 10-1500 mesh according to the purpose of use.

The following examples are for illustrative purposes only and are not intended to limit the scope of the present invention.

Example 1

Polyurethane of 10 g was placed in a high temperature furnace (100) at room temperature, and then nitrogen gas was supplied to make the interior of the furnace a nitrogen atmosphere, and the temperature of a high temperature furnace (100) was elevated to 600° C. at a heating rate of 10° C./min to carbonize for 120 minutes, thereby obtaining 4 g of hard carbon (120).

Subsequently, steam was supplied to the high temperature furnace (100) while maintaining the temperature of the high temperature furnace (100) at 900° C. to convert the inside of the furnace into a steam atmosphere filled with steam, and then the hard carbon (120) was activated at 900° C. for 30 minutes to obtain an active carbon. Subsequently, nitrogen was supplied to the high temperature furnace (100) to make the nitrogen atmosphere, and then the active carbon was cooled to room temperature and 1.22 g of an active carbon, the final product was obtained.

Example 2

The process was performed in the same manner as in Example 1 except that the carbonization was performed at 700° C. instead of 600° C.

Example 3

The process was performed in the same manner as in Example 1 except that the carbonization was performed at 800° C. instead of 600° C.

Example 4

The process was performed in the same manner as in Example 1 except that the carbonization was performed at 900° C. instead of 600° C.

Example 5

The process was performed in the same manner as in Example 1 except that the steam was activated for 40 minutes instead of 30 minutes.

Example 6

The process was performed in the same manner as in Example 2 except that the steam was activated for 40 minutes instead of 30 minutes.

Example 7

The process was performed in the same manner as in Example 3 except that the steam was activated for 40 minutes instead of 30 minutes.

Example 8

The process was performed in the same manner as in Example 4 except that the steam was activated for 40 minutes instead of 30 minutes.

The following test was performed using active carbons prepared in the Examples 1 to 8.

Experimental Example 1

Analysis of Pore Characteristics of Active Carbon

In order to analyze the pore characteristics of the active carbon prepared in Examples 1 to 8, each sample was deaerated at 573K for 6 hours while maintaining the residual pressure at $10^{-3}$ torr or less. Thereafter, the adsorption amount of nitrogen ($N_2$) gas at 77K according to the relative pressure (P/Po) was measured using an isothermal adsorption device (BELSORP-max, BEL JAPAN, Japan) and the specific surface area of active carbon was calculated and the results are shown in Table 1.

Preparation Example 1

Preparation of Electrode for Electrochemical Capacitor Using Active Carbon

Styrene-butadiene rubber (SBR) and carboxymethyl cellulose (CMC) were used as a binder at a ratio of 1:2, and Super-P (Timcal Co.) was used as a conductor. The active carbon prepared in Examples 1 to 8 was mixed in a ratio of 10:10:80 by weight using a three-dimensional mixer. After mixing, the mixture was coated on an aluminum foil with a thickness of 0.125, followed by compression using a roll press at 150° C. and drying in a vacuum oven of 150° C. for 12 hours to produce an electrode for an electrochemical capacitor.

Preparation Example 2

Preparation of Coin Cell-Type Electrochemical Capacitor

The electrode prepared in Preparation Example 1 was perforated to a diameter of 12 mm and processed into a coin cell-type electrode. The separator was made by punching cellulose (NKK Corporation, Japan) with a diameter of 18 mm. A coin unit product having a diameter of 27 mm and a height of 12 mm was used for the preparation of the cell. Coin cell-type electrochemical capacitor was manufactured using 1M tetraethylammonium tetrafluoroborate (TEABF4) as an electrolytic solution and propylene carbonate as a solvent.

Experimental Example 2

Analysis of Electrochemical Properties of Active Carbon

A charge/discharge test was carried out using a charge/discharge device (MACCOR 4300K DESKTOP, MACCOR, USA), to measure charge/discharge at a current of 2 $mA/cm^2$ and calculate the capacitance per weight of the conductor and the binder (F/g) based on discharge graph. The capacitance of the coin cell prepared as above is shown in Table 1.

The Table 1 below shows pore properties and electrochemical characteristics of the active carbon prepared as described above.

TABLE 1

| | polymer | Carbonization temperature (° C.) | Yield after carbonization (%) | Activation temperature (° C.) | Activation time (min) | Yield after carbonization (%) | Specific surface area of active carbon ($m^2/g$) | Capacitance of active carbon (F/g) |
|---|---|---|---|---|---|---|---|---|
| Example 1 | polyurethane | 600 | 40 | 900 | 30 | 30.5 | 2230 | 113.2 |
| Example 2 | polyurethane | 700 | 40 | | 30 | 31.3 | 1920 | 99.2 |
| Example 3 | polyurethane | 800 | 37 | | 30 | 33.9 | 1800 | 92.4 |
| Example 4 | polyurethane | 900 | 35 | | 30 | 42.3 | 1620 | 83.2 |
| Example 5 | polyurethane | 600 | 40 | | 40 | 27.8 | 2340 | 118.0 |

TABLE 1-continued

| polymer | Carbonization temperature (° C.) | Yield after carbonization (%) | Activation temperature (° C.) | Activation time (min) | Yield after carbonization (%) | Specific surface area of active carbon (m²/g) | Capacitance of active carbon (F/g) |
|---|---|---|---|---|---|---|---|
| Example 6 polyurethane | 700 | 40 | | 40 | 29.1 | 2220 | 112.0 |
| Example 7 polyurethane | 800 | 37 | | 40 | 30.9 | 2080 | 105.6 |
| Example 8 polyurethane | 900 | 35 | | 40 | 32.3 | 1760 | 90.4 |

As shown in the Table 1, as the carbonization temperature was lower, the prepared active carbon had better porosity characteristics such as specific surface area and total pore volume, etc. under the same activation condition, and the capacitance, electrochemical characteristics was mostly excellent.

The following Table 2 shows the crystal sizes of the active carbon prepared as described above.

TABLE 2

| polymer | Carbonization temperature (° C.) | Yield after carbonization (%) | Activation temperature (° C.) | Activation time (min) | Size of crystal grain (Å) | Diameter of crystal grain (Å) |
|---|---|---|---|---|---|---|
| Example 1 polyurethane | 600 | 40 | 900 | 30 | 9.29 | 32.0 |
| Example 2 polyurethane | 700 | 40 | | 30 | 9.99 | 33.4 |
| Example 3 polyurethane | 800 | 37 | | 30 | 10.09 | 34.0 |
| Example 4 polyurethane | 900 | 35 | | 30 | 10.18 | 41.7 |
| Example 5 polyurethane | 600 | 40 | | 40 | 9.89 | 35.26 |
| Example 6 polyurethane | 700 | 40 | | 40 | 10.02 | 36.08 |
| Example 7 polyurethane | 800 | 37 | | 40 | 10.14 | 36.48 |
| Example 8 polyurethane | 900 | 35 | | 40 | 10.25 | 44.37 |

As shown in the Table 2, the active carbon carbonized at lower temperature had a smaller crystal size under the same activation conditions.

In addition, the active carbon prepared according to the method of the present invention can remove side reactions in the adsorption or the use of the electrode because there is no ash which is a disadvantage of the conventional coconut shell-based active carbon, and since the environmentally friendly activation method is used by using the steam activation without chemicals, it has an economical benefit and is superior in porosity compared with expensive phenol-based active carbon using an activating agent such as KOH, etc.

Further, when an electrode using the active carbon according to the present invention is applied to an electrochemical capacitor, it is confirmed that the electrochemical performance is excellent.

Hereinafter, a method of preparing hard carbon-based electrode active material having a high specific surface area by controlling the carbonization process according to another embodiment of the present invention will be described with reference to FIG. 4.

Figure 4:
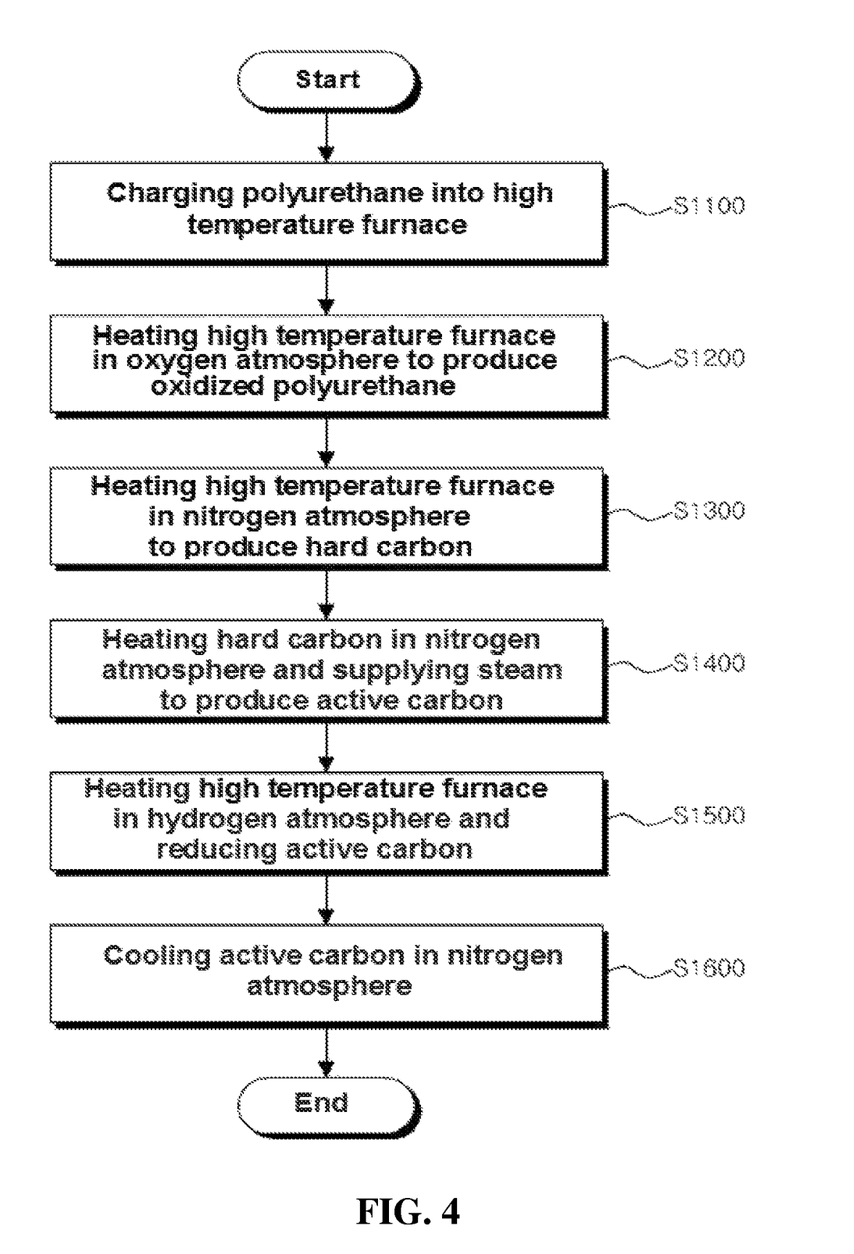
FIG. 4 is a flowchart sequentially illustrating a method of preparing a hard carbon-based electrode active material having high specific surface area by carbonization process control according to another embodiment of the present invention.

Referring to FIG. 4, a method of preparing a hard carbon-based electrode active material having high specific surface area by carbonization process control, may comprise: charging polyurethane into a high temperature furnace (S1100); stabilizing the polyurethane by supplying oxygen gas to the high temperature furnace, heating and oxidizing the polyurethane in an oxygen atmosphere (S1200): supplying a nitrogen gas to the high temperature furnace to heat and carbonize a stabilized polyurethane under a nitrogen atmosphere, thereby producing a hard carbon (S1300); heating the hard carbon under a nitrogen atmosphere, and supplying steam to activate the hard carbon under a steam atmosphere, thereby producing an active carbon (S1400); heating the active carbon under a hydrogen atmosphere and reducing an oxygen functional group of the active carbon under a hydrogen atmosphere (S1500); and cooling the active carbon under a nitrogen atmosphere (S1600).

First, the polyurethane is charged into the high temperature furnace 100 (S1100). At this time, polyurethane having a molecular weight of 300 to 3000 is used and it is preferable to pulverized to have particle size of 10 to 200 mesh in order to facilitate the following carbonization and activation processes.

At this time, if the molecular weight of the polymer polyurethane is less than 300, there is a disadvantage in that the thermal stability of the synthesized polyurethane resin is decreased due to the formation of the monol to occur melting in the carbonization step. If the molecular weight of the polyurethane exceeds 3000, amorphous carbon chains are increased in the polyurethane structure and the thermal stability of the polyurethane resin is lowered.

Also, if the particle size of the polyurethane is less than 10 mesh, the steam does not reach the inside in the activation step, so the activation is not performed well and the pore characteristics are weakened.

If the particle size of the polyurethane is larger than 200 mesh, dust is generated due to the convection by the reaction gas in the carbonization and activation step, and the yield of the active carbon is decreased due to the oxidation of the small particles during the activation.

Next, the polyurethane charged in the high temperature furnace is heated at a high temperature furnace in an oxygen atmosphere supplied with oxygen gas to oxidize the polyurethane to obtain an oxidized polyurethane (S1200).

A finely pulverized polymer is heated to the temperature from 250 to 400° C. at a heating rate of 1 to 10° C./min and then oxidized for 1 to 2 hours in the oxygen atmosphere of the high temperature furnace 100.

If the temperature is less than 250° C., the oxidation/stabilization is not performed. If the temperature exceeds 400° C., the component is peroxidized to reduce the carbon content, thereby decreasing a yield rather and lowering the pore characteristics.

Next, the polyurethane charged in the high temperature furnace 100 is carbonized by heating in a high temperature furnace 100 under a nitrogen atmosphere supplied with nitrogen gas to obtain the hard carbon 120 (S1300).

The interior of the high temperature furnace 100 in which the polyurethane is charged must remove all of the air inside the tube 110 to produce hard carbon powder and active carbon.

For this, nitrogen ($N_2$) gas of at least 99.99% is charged into the tube 110 from the nitrogen inlet tube 130 for 30 minutes or longer to stabilize the inside of the tube before the elevation of the temperature. Subsequently, in the nitrogen atmosphere of the high temperature furnace 100, the finely pulverized polymer is heated from 600 to 1100° C. at a heating rate of 10° C./min and then carbonized for 1 to 2 hours.

If the temperature is less than 600° C., the carbonization is not completely performed, the activation is not performed well, and the pore characteristics are weakened. If the temperature exceeds 1100° C., most the components remain only carbon and a problem that the characteristics are lowered occurs.

Next, the hard carbon 120 obtained in the third step is heated in a high temperature furnace 100 filled with nitrogen gas and filled with nitrogen gas, and is then activated in a high temperature furnace 100 in which the steam is supplied to the filled steam atmosphere to obtain an active carbon (S1400).

If the temperature of the tube 110 filled with nitrogen is maintained at 800 to 1100° C. and the temperature of the high temperature furnace 100 is raised to the activation temperature, the supply of nitrogen gas is stopped, and then steam is supplied to the tube 110 and the inside of the tube 110 is filled with steam and converted into a steam atmosphere, and the hard carbon is activated for 10 to 60 minutes. It is to control the activation reaction of hard carbon by steam based on time.

If the activation temperature is lower than 800° C., the activation reaction of hard carbon is not performed well, and if the activation temperature is higher than 1100° C., the yield is very low due to excessive activation reaction.

As shown in the following Table 3, the activation of the hard carbon is carried out at a high temperature furnace 100 under a nitrogen atmosphere for 10 to 40 minutes, in which nitrogen gas is filled with and maintained at 900° C. and steam is supplied.

In another embodiment, in order to activate the hard carbon, the temperature is maintained at 1,000° C. in a high temperature furnace 100 under a nitrogen atmosphere filled with nitrogen gas and then under steam atmosphere filled with steam for 10 to 20 minutes.

The active carbon obtained by activating hard carbon is reduced under a hydrogen atmosphere to produce reduced active carbon (S1500).

In the hydrogen atmosphere of the high temperature furnace 100, the active carbon is heated to 200 to 350° C. and then oxidized for 30 minutes to 1 hour.

If the temperature is lower than 200° C., the reduction is not performed, and the oxygen functional groups of the active carbon are not reduced. If the temperature exceeds 350° C., the active carbon is oxidized and the pore characteristics are lowered.

Finally, the active carbon obtained by activating hard carbon is cooled under a nitrogen atmosphere to produce active carbon (S1600).

After the step of activating the hard carbon is completed, the supply of water vapor is stopped, and the atmosphere is switched to the nitrogen atmosphere by charging nitrogen to stabilize the inside of the tube 110 and cool the active carbon.

In the cooling step, the active carbon is cooled to room temperature under a nitrogen atmosphere to obtain active carbon which is a final product having excellent physical properties such as pore characteristics. The prepared active carbon is pulverized to 10~1500 mesh according to the purpose of use.

The following examples are for illustrative purposes only and are not intended to limit the scope of the present invention.

Example 11

Polyurethane of 10 g was placed in a high temperature furnace 100 at room temperature, and then oxygen gas was supplied to make the interior of the furnace an oxygen atmosphere, and the temperature of a high temperature furnace (100) was elevated to 350° C. to oxidize for 2 hours and then nitrogen gas was supplied to make the interior of the furnace an nitrogen atmosphere, and the temperature of a high temperature furnace (100) was elevated to 600° C. at a heating rate of 10° C./min to carbonize for 120 minutes, thereby obtaining 4.5 g of hard carbon (120).

Subsequently, steam was supplied to the high temperature furnace 100 while maintaining the temperature of the high temperature furnace (100) at 900° C. to convert the inside of the furnace into a steam atmosphere filled with steam, and then the hard carbon (120) was activated at 900° C. for 30 minutes to obtain an active carbon. Subsequently, hydrogen was supplied to the high temperature furnace (100) to convert it into a hydrogen atmosphere filled with hydrogen, the active carbon was reduced and nitrogen was supplied to the high temperature furnace (100) to make the nitrogen atmosphere, and then the active carbon was cooled to room temperature and 1.54 g of an active carbon, the final product was obtained.

Example 12

The process was performed in the same manner as in Example 11 except that the carbonization was performed at 700° C. instead of 600° C.

Example 13

The process was performed in the same manner as in Example 11 except that the carbonization was performed at 800° C. instead of 600° C.

Example 14

The process was performed in the same manner as in Example 11 except that the carbonization was performed at 900° C. instead of 600° C.

Example 15

The process was performed in the same manner as in Example 11 except that the steam was activated for 40 minutes instead of 30 minutes.

Example 16

The process was performed in the same manner as in Example 15 except that the carbonization was performed at 700° C. instead of 600° C.

Example 17

The process was performed in the same manner as in Example 15 except that the carbonization was performed at 800° C. instead of 600° C.

Example 18

The process was performed in the same manner as in Example 15 except that the carbonization was performed at 900° C. instead of 600° C.

Example 19

The process was performed in the same manner as in Example 11 except that the stabilization was performed at 0° C. instead of 350° C.

Example 20

The process was performed in the same manner as in Example 19 except that the carbonization was performed at 700° C. instead of 600° C.

Example 21

The process was performed in the same manner as in Example 19 except that the carbonization was performed at 800° C. instead of 600° C.

Example 22

The process was performed in the same manner as in Example 19 except that the carbonization was performed at 900° C. instead of 600° C.

Example 23

The process was performed in the same manner as in Example 19 except that the steam was activated for 40 minutes instead of 30 minutes.

Example 24

The process was performed in the same manner as in Example 23 except that the carbonization was performed at 700° C. instead of 600° C.

Example 25

The process was performed in the same manner as in Example 23 except that the carbonization was performed at 800° C. instead of 600° C.

Example 26

The process was performed in the same manner as in Example 23 except that the carbonization was performed at 900° C. instead of 600° C.

The following tests were performed on the active carbon prepared in Examples 11 to 26.

Experimental Example 11

Analysis of Pore Characteristics of Active Carbon

In order to analyze the pore characteristics of the active carbon prepared in Examples 11 to 26, each sample was deaerated at 573K for 6 hours while maintaining the residual pressure at $10^{-3}$ torr or less. Thereafter, the adsorption amount of nitrogen ($N_2$) gas at 77K according to the relative pressure (P/Po) was measured using an isothermal adsorption device (BELSORP-max, BEL JAPAN, Japan) and the specific surface area of active carbon was calculated and the results are shown in Table 3.

Preparation Example 11

Preparation of Electrode for Electrochemical Capacitor Using Active Carbon

Styrene-butadiene rubber (SBR) and carboxymethyl cellulose (CMC) were used as a binder at a ratio of 1:2, and Super-P (Timcal Co.) was used as a conductor. The active carbon prepared in Examples 11 to 26 was mixed in a ratio of 10:10:80 by weight using a three-dimensional mixer. After mixing, the mixture was coated on an aluminum foil with a thickness of 0.125, followed by compression using a roll press at 150° C. and drying in a vacuum oven of 150° C. for 12 hours to produce an electrode for an electrochemical capacitor.

Preparation Example 12

Preparation of Coin Cell-Type Electrochemical Capacitor

The electrode prepared in Preparation Example 11 was perforated to a diameter of 12 mm and processed into a coin cell-type electrode. The separator was made by punching cellulose (NKK Corporation, Japan) with a diameter of 18 mm. A coin unit product having a diameter of 27 mm and a height of 12 mm was used for the preparation of the cell. Coin cell-type electrochemical capacitor was manufactured using 1M tetraethylammonium tetrafluoroborate (TEABF4) as an electrolytic solution and propylene carbonate as a solvent.

Experimental Example 12

Analysis of Electrochemical Properties of Active Carbon

A charge/discharge test was carried out using a charge/discharge device (MACCOR 4300K DESKTOP, MACCOR, USA), to measure charge/discharge at a current of 2 mA/cm² and calculate the capacitance per weight of the conductor and the binder (F/g) based on discharge graph. The capacitance of the coin cell prepared as above is shown in Table 3.

The Table 3 below shows pore properties and electrochemical characteristics of the active carbon prepared as described above.

TABLE 3

|  | Stabilization temperature (° C.) | Carbonization temperature (° C.) | Yield after carbonization (%) | Activation temperature (° C.) | Activation time (min) | Yield after carbonization (%) | Specific surface area of active carbon (m²/g) | Capacitance of active carbon (F/g) |
|---|---|---|---|---|---|---|---|---|
| Example 11 | 350 | 600 | 45 | 900 | 30 | 34.3 | 2350 | 118.6 |
| Example 12 |  | 700 | 45 |  | 30 | 35.1 | 2050 | 104 |
| Example 13 |  | 800 | 41.5 |  | 30 | 38 | 1870 | 96.8 |
| Example 14 |  | 900 | 40 |  | 30 | 47.3 | 1690 | 86.8 |
| Example 15 |  | 600 | 45 |  | 40 | 31.3 | 2460 | 123.5 |
| Example 16 |  | 700 | 45 |  | 40 | 32.6 | 2320 | 117.2 |
| Example 17 |  | 800 | 41.5 |  | 40 | 34.7 | 2110 | 109.5 |
| Example 18 |  | 900 | 40 |  | 40 | 36.2 | 1850 | 93.2 |
| Example 19 | 0 | 600 | 40 |  | 30 | 30.5 | 2230 | 113.2 |
| Example 20 |  | 700 | 40 |  | 30 | 31.3 | 1920 | 99.2 |
| Example 21 |  | 800 | 37 |  | 30 | 33.9 | 1800 | 92.4 |
| Example 22 |  | 900 | 35 |  | 30 | 42.3 | 1620 | 83.2 |
| Example 23 |  | 600 | 40 |  | 40 | 27.8 | 2340 | 118 |
| Example 24 |  | 700 | 40 |  | 40 | 29.1 | 2200 | 112 |
| Example 25 |  | 800 | 37 |  | 40 | 30.9 | 2080 | 105.6 |
| Example 26 |  | 900 | 35 |  | 40 | 32.3 | 1760 | 90.4 |

As shown in the Table 3, as the carbonization temperature was lower, the prepared active carbon had better porosity characteristics such as specific surface area and total pore volume, etc. under the same activation condition, and the capacitance, electrochemical characteristics was mostly excellent.

The following Table 4 shows the crystal sizes of the active carbon prepared as described above.

TABLE 4

|  | Carbonization temperature (° C.) | Yield after carbonization (%) | Activation temperature (° C.) | Activation time (min) | Size of crystal grain (Å) | Diameter of crystal grain (Å) |
|---|---|---|---|---|---|---|
| Example 11 | 350 | 600 | 900 | 30 | 10.22 | 35.2 |
| Example 12 |  | 700 |  | 30 | 11.01 | 36.7 |
| Example 13 |  | 800 |  | 30 | 11.13 | 37.5 |
| Example 14 |  | 900 |  | 30 | 11.23 | 45.7 |
| Example 15 |  | 600 |  | 40 | 10.95 | 38.6 |
| Example 16 |  | 700 |  | 40 | 10.03 | 39.5 |
| Example 17 |  | 800 |  | 40 | 11.21 | 40.1 |
| Example 18 |  | 900 |  | 40 | 11.32 | 48.6 |
| Example 19 | 0 | 600 |  | 30 | 9.29 | 32 |
| Example 20 |  | 700 |  | 30 | 9.99 | 33.4 |
| Example 21 |  | 800 |  | 30 | 10.09 | 34 |
| Example 22 |  | 900 |  | 30 | 10.18 | 41.7 |
| Example 23 |  | 600 |  | 40 | 9.89 | 35.26 |
| Example 24 |  | 700 |  | 40 | 10.02 | 36.08 |
| Example 25 |  | 800 |  | 40 | 10.14 | 36.48 |
| Example 26 |  | 900 |  | 40 | 10.25 | 44.37 |

As shown in the Table 4, the active carbons carbonized at low temperature showed smaller crystal size under the same activation condition, and the size of crystals increased slightly through the stabilization process.

Table 5 below shows changes in oxygen content and storage capacity of the active carbon prepared as described above.

TABLE 5

|  | Oxygen content of active carbon (wt %) | Oxygen content of reduced active carbon (wt %) | Capacitance of active carbon (F/g) | Capacitance of reduced active carbon (F/g) |
|---|---|---|---|---|
| Example 11 | 15.1 | 3.2 | 118.6 | 128.1 |
| Example 12 | 15.3 | 3.1 | 104 | 113.4 |
| Example 13 | 15.1 | 3.3 | 96.8 | 107.4 |
| Example 14 | 15.5 | 3.2 | 86.8 | 95.5 |
| Example 15 | 16.9 | 3.5 | 123.5 | 133.4 |
| Example 16 | 17.1 | 3.2 | 117.2 | 127.7 |
| Example 17 | 17.2 | 3.1 | 109.5 | 120.5 |
| Example 18 | 17.5 | 3 | 93.2 | 103.5 |
| Example 19 | 15.2 | 3.3 | 113.2 | 126.8 |
| Example 20 | 15.3 | 3.4 | 99.2 | 105.2 |
| Example 21 | 15.5 | 3.1 | 92.4 | 102.6 |
| Example 22 | 15.5 | 3.2 | 83.2 | 90.7 |
| Example 23 | 17.2 | 3.3 | 118 | 127.4 |
| Example 24 | 17.3 | 3 | 112 | 124.3 |

TABLE 5-continued

|  | Oxygen content of active carbon (wt %) | Oxygen content of reduced active carbon (wt %) | Capacitance of active carbon (F/g) | Capacitance of reduced active carbon (F/g) |
|---|---|---|---|---|
| Example 25 | 17.8 | 3.5 | 105.6 | 116.2 |
| Example 26 | 17.8 | 3.3 | 90.4 | 100.3 |

As shown in the Table 5, the oxygen content of the produced active carbon was decreased through the reduction process, and the storage capacity was increased due to the decrease of oxygen content.

In addition, the active carbon prepared according to the method of the present invention can remove side reactions in the adsorption or the use of the electrode because there is no ash which is a disadvantage of the conventional coconut shell-based active carbon, and since the environmentally friendly activation method is used by using the steam activation without chemicals, it has an economical benefit and is superior in porosity compared with expensive phenol-based active carbon using an activating agent such as KOH, etc.

Further, when the electrode using the active carbon according to the present invention was applied to an electrochemical capacitor, it was confirmed that the electrochemical performance was excellent.

The embodiments of the present invention described above are not implemented only by the apparatus and/or method, but may be implemented through a program for realizing functions corresponding to the configuration of the embodiment of the present invention, a recording medium on which the program is recorded, and such an embodiment can be readily implemented by those skilled in the art from the description of the embodiments described above.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a hard carbon-based electrode active material having a high specific surface area, the method comprising:
   a first step of charging polyurethane into a furnace;
   a second step of stabilizing the polyurethane under an oxygen atmosphere by supplying oxygen gas to the furnace and by heating the furnace to reach an internal temperature of 250 to 400° C. so as to oxidize the polyurethane;
   a third step of carbonizing the stabilized polyurethane under a nitrogen atmosphere by supplying a nitrogen gas to the furnace and by heating the furnace to reach an internal temperature of 600 to 900° C., thereby producing a hard carbon;
   a fourth step of activating the hard carbon by heating the hard carbon in the furnace under a nitrogen atmosphere to maintain an activation temperature of 800 to 1100° C. and by supplying steam to the furnace maintained at the activation temperature, thereby producing an active carbon;
   a fifth step of heating the active carbon under a hydrogen atmosphere and reducing an oxygen functional group of the active carbon under the hydrogen atmosphere; and
   a sixth step of cooling the active carbon under a nitrogen atmosphere,
   wherein the polyurethane charged into the furnace in the first step has an average molecular weight of 300 to 3000 and is pulverized to have a particle size of 10 to 200 mesh.

2. The method of claim 1, wherein in the second step, the furnace is heated to reach the internal temperature of 250 to 400° C. at a rate 1-10° C./min, and the oxidation is performed for 1 to 2 hours thereafter.

3. The method of claim 1, wherein the oxygen gas of the second step is provided as a mixture gas having oxygen in a concentration of 10 to 21%.

4. The method of claim 1, wherein in the third step, the furnace is heated to reach the internal temperature of 600 to 900° C. at a rate 1-10° C./min, and the carbonization is performed for 1 to 2 hours thereafter.

5. The method of claim 1, wherein in the fourth step, the steam is supplied after maintaining the activation temperature at 900° C., and the hard carbon is activated in a steam atmosphere provided by the supplied steam for 10 to 40 minutes.

6. The method of claim 1, wherein in the fifth step, the furnace is heated to reach an internal temperature of 200 to 350° C. in order to conduct said reducing.

7. The method of claim 1, wherein the hydrogen atmosphere of the fifth step comprises a mixture gas having hydrogen in a concentration of 1 to 20%.

8. The method of claim 1, wherein the high specific surface area is from 1,620 to 2,460 m$^2$/g.

9. The method of claim 1, wherein in the fourth step, the steam is supplied after maintaining the activation temperature at 1000° C., and the hard carbon is activated in a steam atmosphere provided by the supplied steam for 10 to 20 minutes.

* * * * *